United States Patent [19]

Hess et al.

[11] 3,807,564
[45] Apr. 30, 1974

[54] COMPACT SEWAGE TREATMENT UNIT

[76] Inventors: Howard V. Hess, Glenham; Edward L. Cole, Fishkill, both of N.Y.

[22] Filed: Dec. 6, 1972

[21] Appl. No.: 312,458

Related U.S. Application Data

[63] Continuation-in-part of Ser. No. 15,016, Feb. 27, 1970, abandoned, and a continuation-in-part of Ser. No. 168,932, Aug. 4, 1971, abandoned.

[52] U.S. Cl.................. 210/177, 210/180, 210/187, 201/2.5, 201/25
[51] Int. Cl........................................... B01d 17/00
[58] Field of Search....... 210/180, 187, 67, 71, 177; 201/2.5, 25; 48/111, 209; 110/8 R

[56] References Cited
UNITED STATES PATENTS
437,659  9/1890  Noppel .............................. 210/180

*Primary Examiner*—Samih N. Zaharna
*Assistant Examiner*—F. F. Caluetti
*Attorney, Agent, or Firm*—T. H. Whaley; C. G. Ries

[57] ABSTRACT

A compact sewage treatment unit has at least one pressure vessel containing a heat exchanger in which a waste stream is heated to coking temperature to coke the bulk of the organic wastes except for greases which are collected in a trap tray in the upper part of the heat exchanger and discharged. Gas formed during coking is removed through a pressure relief valve. A trap tray near the bottom of the heat exchanger serves to separate the coke and the decoked effluent. The effluent passes around the tube and up the side of the pressure vessel to serve as a heat transfer medium for the coking reaction and for heating the incoming waste slurry to coking temperature. A sparger is provided above the heated zone for bringing oxygen or air in contact with the decoked effluent to oxidize any dissolved organic materials which were not coked. The unit is particularly useful for shipboard use and in apartments.

5 Claims, 1 Drawing Figure

PATENTED APR 30 1974 3,807,564
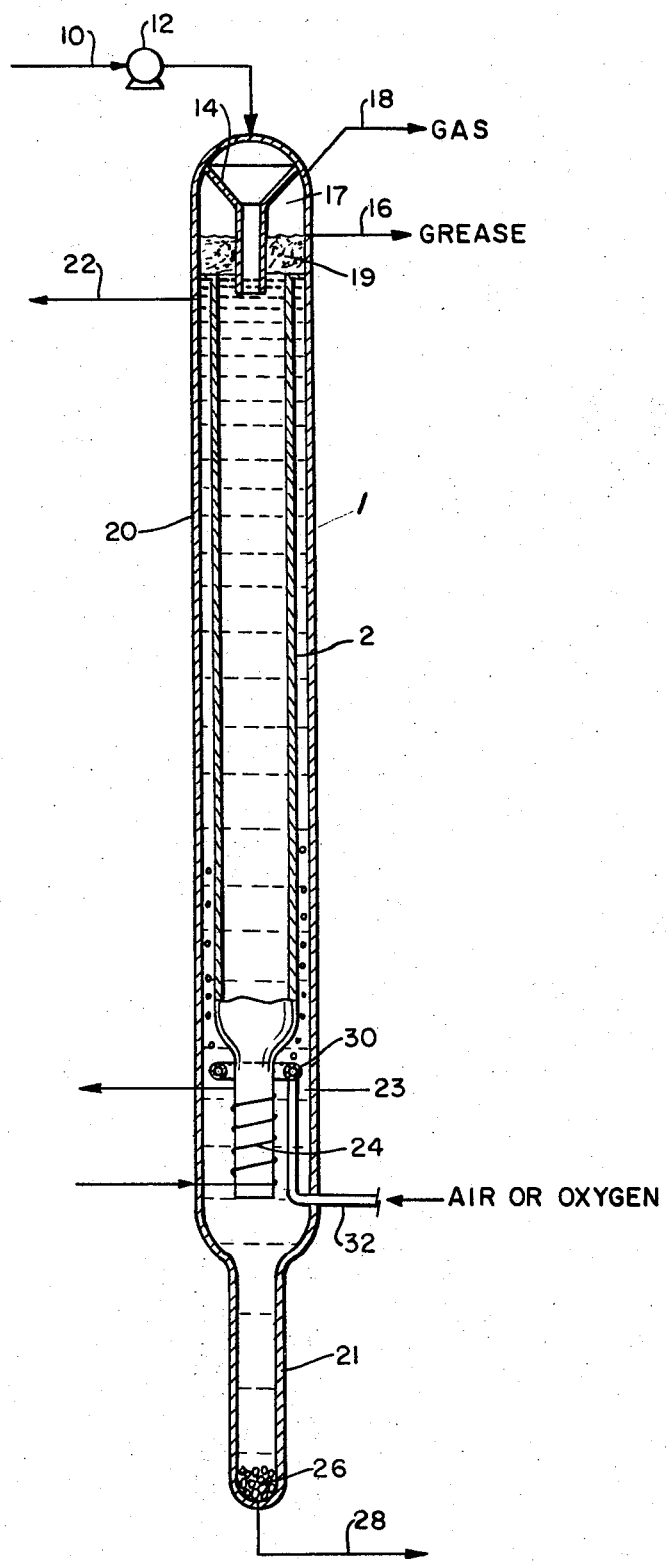

COMPACT SEWAGE TREATMENT UNIT

CROSS REFERENCE TO COPENDING APPLICATION

This application is a continuation-in-part of commonly assigned patent application Ser. No. 15,016 filed Feb. 27, 1970 and now abandoned and of commonly assigned patent application Ser. No. 168,932 filed Aug. 4, 1971 and now abandoned.

This invention is concerned with a waste disposal unit utilizing the techniques of coking wastes in the liquid phase under pressure.

In accordance with the invention there is provided a sewage treatment unit including at least one pressure vessel containing a heat exchanger adapted to receive slurried waste; heating means for coking the bulk of the waste and trap tray devices located at the top and near the bottom of the heat exchanger for separating greases and solids, from the effluent after the coking operation and means positioned above the heating means for introducing air or oxygen into the decoked effluent to oxidize any dissolved organic materials which were not coked.

The invention will be better understood by reference to the single FIGURE of the drawing which shows schematically by way of example one possible embodiment of the invention.

As illustrated in the drawing, a sewage treatment unit according to the invention has at least one pressure vessel 1 and open ended, heat-conducting tube 2 to which slurried waste is pumped by pump 12 from a waste source 10. Typically such waste will include kitchen wastes, paper and body products and will have been previously slurried by grinders or combed of solids by mechanical separators which form no part of the present invention.

The waste slurry is pumped up to pressure of around 1,000 psig and passes down the inside of heat exchanger tube 2 which is suspended at its top and open at its bottom. A heater 24 shown as a heating coil wound round the bottom of tube 2 heats the waste stream to a coking temperature of around 550° F. and the bulk of the organic wastes, except for the greases, is coked as it passes through tube 2. The grease and the gaseous mixture consisting mainly of $CO_2$ with minor amounts of $H_2S$, mercaptan, hydrogen and gaseous hydrocarbons, being less dense than water go to the top of the unit where they are collected in the tray 14. This tray is used to isolate both gas and grease so that they may be removed from the system. The removal of these materials is on level control and adjusted so that grease and gas will be removed through lines 16 and 18. The exact type of level control used need not be the one shown as long as it is capable of maintaining an interface above the trap tray so that fresh feed cannot bypass the coker and come out of the top of the vessel. Thus there may be used for this purpose level control devices which depend on the electrical resistance between water and grease phases.

The arrangement shown in the drawing provides for discharge of the grease through line 16 which is in effect an overflow spill whenever its thickness exceeds a given amount. Some gas will also be removed through line 16 but most will build up in gas chamber 17 and will be removed through 18 which has a pressure relief valve connected thereto.

The coke 26 and the liquid effluent pass through the bottom of tube 2 which is essentially a trap tray arrangement. The liquid effluent and coke are separated by density and the coke is collected in the boot 21 from which it is periodically removed through line 28. The decoked effluent passes around heater 24 and back up the annular space 23 between vessel 1 and tube 2, thereby serving as a heat transfer medium for the coking reaction and for heating the waste slurry from its ambient temperature to coking temperature which may be from 400° to 700° F. The effluent passes out through outlet 22. The coke which is produced is sterile and non-putrescible.

The circular sparger (30), through which air or oxygen is distributed into the liquid effluent after separation of the coke, is mounted in suitable fashion above the heated zone. Compressed air or oxygen at system pressure is preheated by passing through line 32 up through the hot liquid surrounding the heater section and then is sparged into the effluent in the annular space 23 and serves to oxidize the dissolved organic materials which were not removed as coke. The heat released by oxidation of these organic materials is transferred to the liquid in pipe 2, thus serving as additional preheat for the feed. The oxidized liquid effluent and gas are removed through line 22 for disposal. The liquid is essentially free from BOD or COD and is sterile. Controlled with the grease level at its top it is impossible for any of the aqueous waste feed to come out the top. Actually the flow system can be described as essentially a liquid being pumped in the top of the vessel through line 10, down through tube 2, up through annular space 23 and out line 2. The whole system being liquid phase (except for the gas which is isolated and the coke which is isolated) it is essentially a pumping operation.

Pressure vessel 1 suitably can be made of metals or alloys capable of withstanding system pressure and temperature. The other elements of the system have no pressure requirements except for the heater. Numerous corrosion resistant alloys will suggest themselves to those skilled in the art.

The heating means alternately can be placed within the lower portion of tube 2. Such means can be high pressure steam from a ship's boilers, hot flue gas from either the ship's boilers or from incinerating the produced coke or any other convenient source such as electricity.

It will be appreciated by those skilled in the art that control devices may be associated with the above-described system so as to make the same completely automatic. Such automatization is, therefore, within the purview of the claimed invention.

The present invention is particularly suitable for use on shipboard unit it will be evident to those skilled in the art that the same may be used also on other means of transportation, in particular on aircrafts. Similarly, it will be appreciated that the present system can be scaled up for land-based applications, such as the handling of: packing house wastes where disposal of grease is also a problem; the treatment of oil-algae-sludge-water emulsion; and the treatment of effluent from apartment house complexes.

What is claimed is:

1. Compact sewage treatment unit comprising: pump means for continuously pumping sewage to a coking pressure of around 1000 psig;

at least one pressure vessel and in said vessel an open ended heat exchange tube spaced from said vessel defining a closed annular chamber therebetween and suspended therein from its top;

inlet means constructed and arranged to receive sewage from said pump means; said inlet means communicating with said tube; means for coking said sewage comprising, a coking zone in the lower part of said tube, heating means in said zone for coking said sewage in the liquid phase and converting same into sterile coke, gases, grease and sterile effluent; and level control means above said tube, said control means being adapted to maintain a grease-liquid interface above the inlet of said tube such that fresh waste cannot bypass said tube; separate grease and gas discharge means mounted in the upper part of said vessel, sparging means about said coking zone for introducing air into said effluent as it emerges from said zone to oxidize any organic materials dissolved therein;

solid-liquid separating means mounted at the bottom of said vessel, and liquid outlet means mounted in the upper part of said vessel such that heated liquid emerging from the lower end of said tube is able to ascend in said annular chamber to reach said liquid outlet means thereby preheating said sewage and an outlet for solids communicating with said separating means.

2. Unit according to claim 1 wherein said control means consist of an overflow adapted to control the thickness of a grease layer serving to prevent ascent of fresh waste entering said system.

3. Unit according to claim 1 wherein said gas discharge means consist of a pressure relief valve.

4. Unit according to claim 1 wherein said solid-liquid separating means consist of a tray trap.

5. Unit according to claim 1 wherein said tube has a lower end of reduced diameter defining an annular space with the walls of said vessel, said sparging means being positioned in said annular space.

* * * * *